United States Patent [19]

Davies

[11] Patent Number: 5,288,152
[45] Date of Patent: Feb. 22, 1994

[54] BEARING FOR AN ELECTROPHOTOGRAPHIC APPARATUS

[76] Inventor: Wilkins L. Davies, P.O. Box 4806, Clearwater, Fla. 34618

[21] Appl. No.: 980,511

[22] Filed: Oct. 20, 1992

[51] Int. Cl.[5] .............................................. F16C 17/02
[52] U.S. Cl. ................................... 384/220; 384/125; 384/296
[58] Field of Search ............... 384/220, 296, 125, 222, 384/221, 215

[56] References Cited

U.S. PATENT DOCUMENTS

| | | | |
|---|---|---|---|
| 3,033,624 | 5/1962 | Biesecker | 384/125 |
| 4,573,816 | 3/1986 | Pamler | 384/220 |
| 4,655,614 | 4/1987 | Schott | 384/220 |
| 4,927,275 | 5/1990 | Lawson | 384/220 |

*Primary Examiner*—Lenard A. Footland
*Attorney, Agent, or Firm*—David Kiewit

[57] ABSTRACT

A replacement bearing is provided for use in rebuilding the nominally disposable toner cartridges that are commonly used in popularly priced electrostatic printers and copiers. When the bearing is rotated into its final position about the shaft of a toner roller, an oversize portion of the bearing is forced into a position that ensures that both the bearing retainer and the toner roller are restrained in a precise alignment. A slot, that has a predetermined gap when installed, is preferably provided in the bearing, and a decrease of the width of this gap is indicative of bearing wear. The precise alignment and wear indication means that are provided by the new bearing allow an operator to rebuild a toner cartridge that had been demonstrating the "right side problem", and to subsequently monitor the wear of a replacement bearing so as to prevent recurrence of copy degradation.

11 Claims, 3 Drawing Sheets

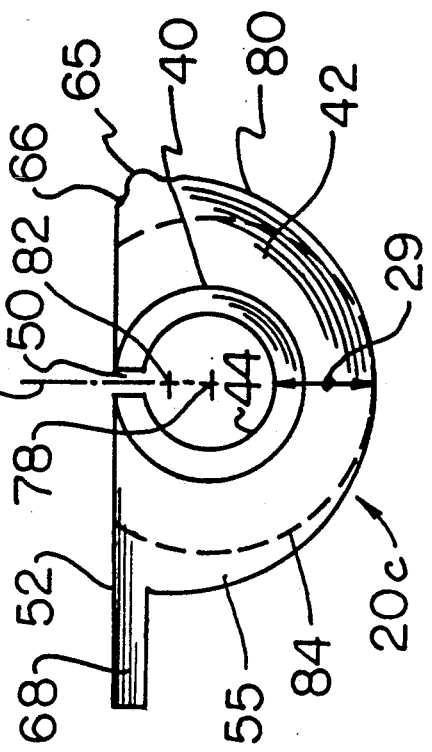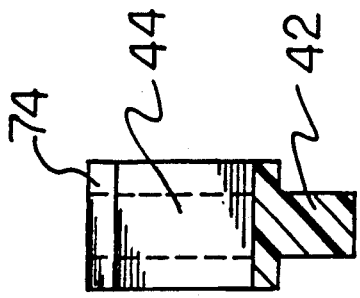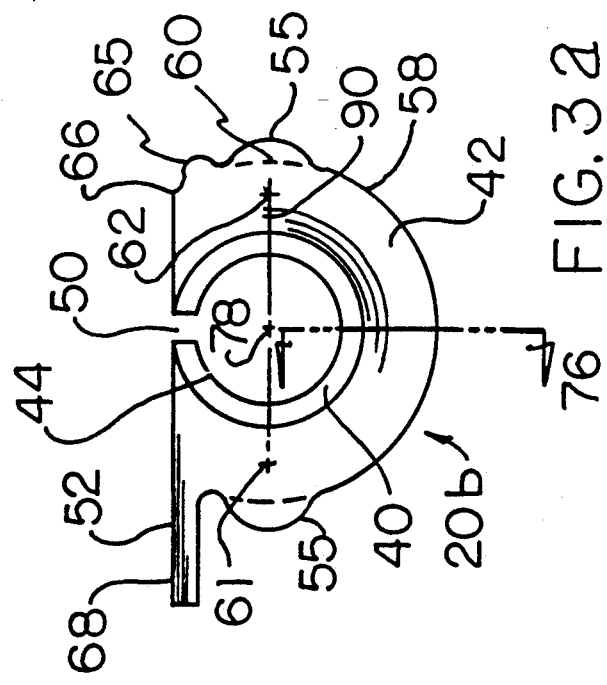

BEARING FOR AN ELECTROPHOTOGRAPHIC APPARATUS

FIELD OF THE INVENTION

This invention provides method and apparatus for rebuilding nominally disposable toner cartridges commonly used in electrostatic printers and copiers.

BACKGROUND OF THE INVENTION

It is common practice in the office printer and copier industry to make a lower priced copier or printer with a toner dispensing portion that is nominally a disposable cartridge. This cartridge commonly includes a toner bin, as well as a combination of a doctor blade and a gear-driven magnetic roller that is used to meter the toner onto a charged photoconductive surface.

The cost of replacing nominally disposable cartridges can be a significant fraction of the total cost of ownership. These cartridges commonly retail for 10–20% of the price of a new printer or copier. This high cost has given rise to an entire sub-industry of toner cartridge recyclers who recharge (and sometimes rebuild) the cartridges for a fraction of their new cost.

Although a cartridge can be refilled with toner many times, the precise mechanical and electrical components of the toner cartridge wear out and soon produce a visible degradation of copy quality. Since the cartridge is designed with the expectation of a short service life, serious wear problems can be encountered after only a few rechargings. Diagnosing just what wear mechanism causes which sort of copy degradation is a challenge for the re-builder, who must seek for his answers in an area unanticipated by the original designers. An example of such a diagnostic and corrective procedure is presented in a related patent application by the inventor. In his U.S. application, Ser. No. 07/823,290, the disclosure of which is herein incorporated by reference, the inventor described method and apparatus for maintaining copy quality by providing a substitute for a worn electrical contact to the toner roller.

One of the quality issues that has not been successfully addressed by the toner cartridge re-building industry is that of the "right side problem" in which a dark streak or gray background appears towards the right side of the imprinted surface of a piece of paper that has been processed through an affected electrostatic copier or printer. Re-builders have observed that when a printer or copier exhibits this effect, there is usually a build-up of excess toner on the corresponding "right side" of the corona wire (located adjacent the toner roller). Toner build-up on the corona wire can partially electrostatically shield the photoconductive drum, which prevents the corresponding "right side" of the photoconductor surface from being fully charged thus causing the observed dark streak on the right side of the paper.

Some re-builders have hypothesized that excess toner is blown onto this portion of the corona wire by a cooling fan (an exhaust vent for the air stream is normally adjacent the "right side" end of the corona wire) and have suggested placing a permanent magnet adjacent the corona wire to preferentially capture the toner (which is ferromagnetic) that would otherwise get on the wire.

The inventor has found no one in the industry who has suggested solving the "right side" problem by controlling the gap between the doctor blade and the toner roller and thereby preventing excess toner from getting out of the cartridge in the first place. This is not surprising, since (as will become apparent in the following discussion) the gap may open excessively only during printer operation, but remain within specification when the unit is at rest.

SUMMARY OF THE INVENTION

It is an object of the invention to reduce excess toner deposition near the right side of the image-bearing surface of a sheet of paper that has been processed through an electrostatic printer or copier.

It is a further object of the invention to reduce toner consumption in an electrostatic printer or copier.

It is an object of the invention to provide a method of rebuilding a worn toner cartridge so as to assure a uniform and accurately set gap between the doctor blade and the toner roller of the rebuilt cartridge.

It is a specific object of the invention to provide a bearing and a method of installing that bearing in place of a worn factory-installed bearing on a toner roller in order to extend the service life of a dry toner cartridge in an electrostatic printer or copier.

It is yet a further object of the invention to allow rebuilding of a toner cartridge without having to place a magnet near the corona wire in order to capture excess toner.

It is yet a further object of the invention to provide an indication of bearing wear to a toner cartridge recharger.

DESCRIPTION OF THE DRAWING

FIG. 3 of the drawing shows two views of the improved bearing. FIG. 3a is a side elevational view of one version of the improved bearing, with selected regions shown with distorted sizes for the sake of illustration. FIG. 3b is cross-sectional view taken through the section marked with reference numeral 76 in FIG. 3a.

FIG. 4 of the drawing is a side elevational view of a second version of the improved bearing, with selected regions distorted for the sake of illustration.

FIG. 5 of the drawing is a cross-section taken on a plane indicated as 70—70 in FIG. 1.

DETAILED DESCRIPTION

Figures 1, 2:
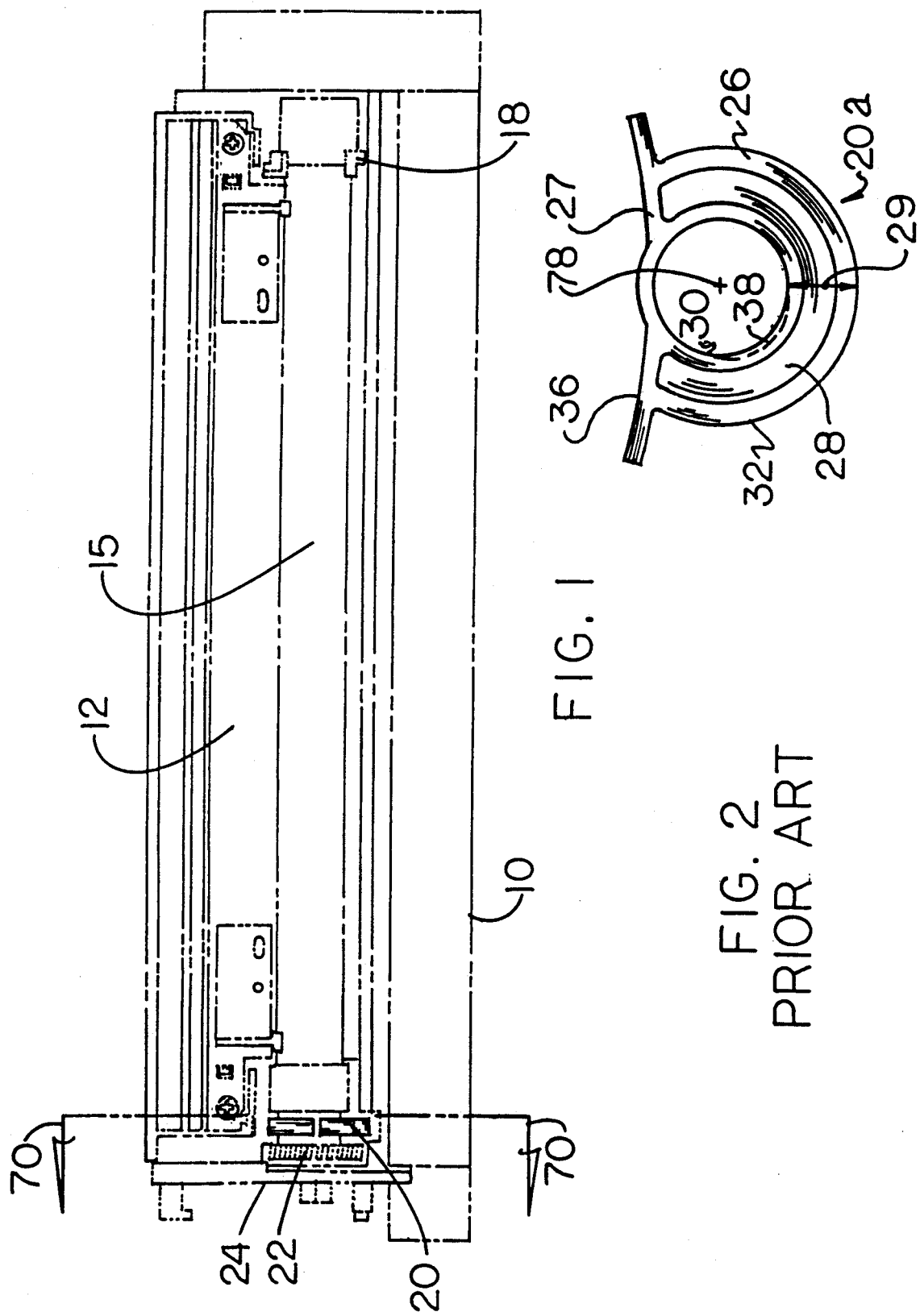
FIG. 1 of the drawing is a front plan view of a toner cartridge in which the bearing of the invention is installed.
FIG. 2 of the drawing is a side elevational view of a prior art bearing.

Turning now to FIG. 1 of the drawing, one finds a toner cartridge typical of those that may be re-built according to the invention. A cartridge body 10 holds a doctor blade 12 and a toner roller 15. The doctor blade 12 can be fastened to the cartridge body 10 with a variety of screws, locating bosses, and the like that are well known in the art and that allow the edge of the blade 12 to be set parallel to the axis of the toner roller 15 and a controlled distance (e.g. 0.008–0.010") from the surface of the roller 15. The toner roller 15 is held in position in the cartridge body by bearings 18, 20 at either end thereof, and is rotated about its axis by means of a gear 22.

Satisfactory precision in metering the dry toner onto the roller requires a carefully set gap of approximately 0.008"–0.010" between the doctor blade 12 and the toner roller 15. The requisite precision can be readily attained during original equipment manufacture, and is normally held during the designed service life of the cartridge (i.e. in the absence of recharging). Progressive wear of the various components of the cartridge eventually leads to an uncontrolled and asymmetrical gap width, as will be subsequently discussed.

It is noteworthy that the two bearings 18, 20 have entirely different wear characteristics and wear mechanisms. The un-driven end bearing 18 outlasts the driven end bearing 20, which is subject to other forces that will be subsequently described. For the purposes of this disclosure, the service life of the un-driven end bearing 18 is of no concern, and the teachings herein presented will be directed at improvements to the driven-end bearing 20.

Turning now to FIG. 2 of the drawing, one finds an end view of a prior art version 20a of the driven-end bearing 20. The bearing 20a is generally a radially truncated disk that has outer 26 and inner 27 walls separated by a thinner web 28 region. The bearing 20a has a cylindrical inner bearing surface 30 that has a radius slightly greater than the end shaft 31 of the toner roller 15 about which it fits so that the bearing 20a can be easily slid onto the shaft 31 during assembly. The bearing 20a has a concentric outer cylindrical surface portion 32 that fits into a cylindrical bearing retainer 34 that is part of the end cap 24. The inner and outer surfaces of an OEM bearing (e.g. FIG. 20a) are separated by a predefined rear web width 29 that is marked with a double-headed arrow in FIG. 2. Since the bearing 20a can not extend substantially further outward than the toner roller 15 (i.e. the toner roller 15 needs to be brought into a close-spaced relation with the photoconductor surface so that it can donate toner to the charged photoconductor), the bearing 20a also has a generally flat outer surface portion 36 (i.e. the part of the bearing 20 that is visible in the elevation of FIG. 1).

Observations on bearings taken from used toner cartridges show that the inner surface 30 of the bearing 20 does not wear uniformly. Reaction forces to driving torques applied to the toner roller 15 by the driven gear 22, in combination with other forces (e.g. the weight of toner in the hopper) act to preferentially wear a portion 38 (shown in phantom in FIG. 2 of the drawing) that is approximately diametrically opposite that portion of the bearing 20 that is nearest the doctor blade 12. Thus, as wear progresses, the gap between the driven-end of the toner roller 15 and the doctor blade 12 becomes wider during the operation of the printer or copier. (The inventor has measured a gap of as much as 0.016" adjacent the driven-side bearing 20 in a worn cartridge by restraining the roller from turning and applying pressure to the drive gear (i.e. by simulating the torques associated with driving the roller). The same cartridge had a gap of 0.008–0.010" adjacent the un-driven bearing 18). This wear-induced wedge-shaped gap allows excess toner to be donated to the "right side" of the photoconductor. Other excess toner drifts into the neighborhood of the corona wire and preferentially builds up on the "right side" of the corona wire. Thus it appears that preferential wear of a bearing on the toner roller is the principal cause of the "right side problem", which is perhaps more properly called the "driven-side problem" or "gear-side problem". The terms "right side" and "left side", as used above, rapidly become ambiguous unless one understands that they refer strictly to the named side of the image-bearing surface of a sheet of paper and, by inference, to corresponding portions of the mechanisms that process that paper.

Note that when the toner roller 15 is not being driven, the rear web width 29 of the bearing 20a holds the roller in the proper position so that a normal gap width is measured between the toner roller 15 and doctor blade 12 as long as the preferential wear 38 has not reduced the rear web width 29.

Turning now to FIG. 3a of the drawing, one finds an end view of a bearing 20b of the invention. The bearing 20b, like the bearing 20a that it replaces, is in the form of a radially truncated disk with an inner wall 40 and a surrounding body portion 42 that is shown in FIG. 3b as being of uniform thickness, but that may also be configured similarly to the webbed design shown in FIG. 2. The radius of the cylindrical inner surface 44 of bearing 20b is chosen to be essentially the same or larger than that of bearing 20a so that the replacement bearing 20b can be easily slid over the end shaft 31 of the toner roller 15.

One key improvement in the replacement bearing 20b is a radial slot 50 (preferably approximately 0.030" in width) that extends from the inner surface 44 to a generally flat portion 52 of the outer surface of the bearing 20b, the flat portion being a plane parallel to the cylindrical axis of the inner wall 44 of the bearing.

A second key improvement in the new bearing 20b is the provision of additional material 55 adjacent the outer prolate surface 58 of the bearing 20b. The additional material 55 can be seen from FIG. 3a to extend beyond the phantom surface 60 that would have been formed approximately ninety degrees of arc from the flat surface portion had the new bearing 20b been made with the same outer radius as the cylindrical prior art bearing 20a. This additional material 55 may preferably add approximately 0.004" to 0.008" to the prolate radius of the distorted cylindrical outer surface 58 of bearing 20b.

It should be noted that the additional material 55 of the bearing 20b may be provided by a variety of composite surface geometries. The outer surface 58 could, for example, be a section of right elliptical cylinder. In a preferred embodiment, however, the outer surface 58 is constructed using arcuate segments that are the surfaces of sections of right circular cylinders drawn about two axes 61, 62 that are displaced from the principal axis 78 of the bearing 20b along a fictitious line segment 90 parallel to the flat face 52 of the bearing 20b. This construction, shown in FIGS. 3a and 3b of the drawing, provides the additional material 55 while maintaining the same rear web width 29 as was found in the OEM bearing 20a that is to be replaced.

Another feature of the new bearing 20b is a small locking ridge 65 on the outer bearing surface 58 adjacent one end 66 of the generally flat portion 52 of the bearing 20b. The purpose of this locking ridge 65, which may preferably protrude approximately 0.002" above the surface 58, will be subsequently discussed. The ear 68 that constitutes the other end of the generally flat portion 52 of the bearing 20b is provided as a handle for the operator to used during installation of the bearing 20b.

Turning now to FIG. 4 of the drawing, one finds an elevational view of a second bearing 20c of the invention. The bearing 20c, like bearings 20a and 20b, is in the form of a radially truncated disk with an inner wall 40 and a surrounding body portion 42. The inner surface 44 of bearing 20c is the same as that of bearing 20b discussed above, i.e. it is a section of a circular cylinder with an axis indicated with reference numeral 78 in FIG. 4. The outer surface 80 of bearing 20c is also cylindrical, but has a second axis 82 and a larger radius, which are chosen so as to provide the additional material 55 (shown as lying between the outer bearing surface 80 and a phantom right cylindrical surface 84, formed about the first cylindrical axis 78) while keeping the critical rear web width (indicated by a double headed arrow 29 in FIG. 4) between the first cylindrical axis 78 and the outer surface 80 of the bearing the same as it was for the OEM bearing 20a shown in FIG. 2.

Although the bearing 20c is shown, for purposes of illustration, in FIG. 4 as having two dramatically disparate cylindrical radii, the actual differences in radii and in axial positionings are small. In the preferred construction, the outer cylindrical bearing surface 80 has a radius approximately 0.005" greater than that of the inner cylindrical surface 44—i.e. the second cylindrical axis 82 is displaced only about 0.005" from the first cylindrical axis 78 along a fictitious line segment 92 that runs from the axis 78 to the flat portion 52 of the bearing 20c.

Thus, the invention provides bearings 20b and 20c that can be viewed as having been derived from the OEM bearing 20a by adding additional material 55 to a portion of the outer surface 32 of bearing 20a, where that portion lies between a phantom outer surface 60 and a cylindrical section formed about an axis that may be translated from the cylindrical axis 78 of the original bearing 20a. The translation may be in a variety of directions, including parallel to the flat surface portion 52 (bearing 20b) or perpendicular to the flat surface portion (bearing 20c).

Figure 5B:
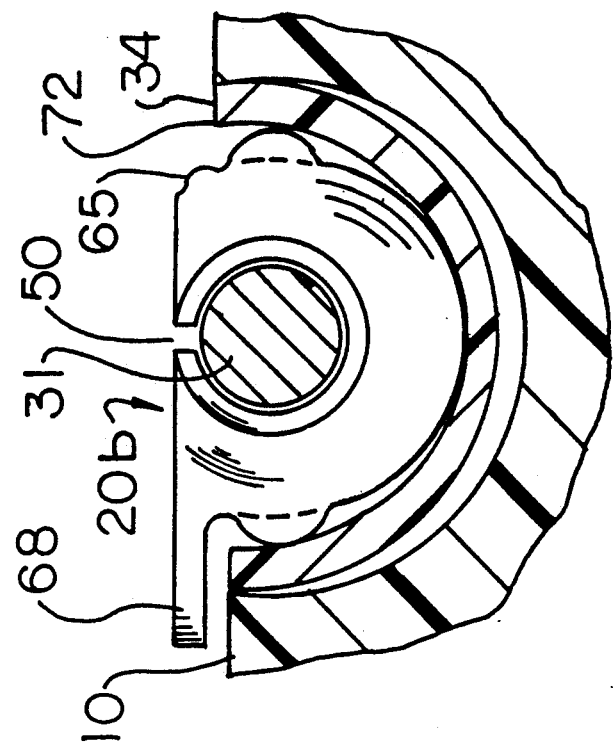
FIG. 5a–b illustrate two steps in the process of installing the bearing of the invention into a housing after the bearing has been placed on the toner roller shaft.
Figure 5A:
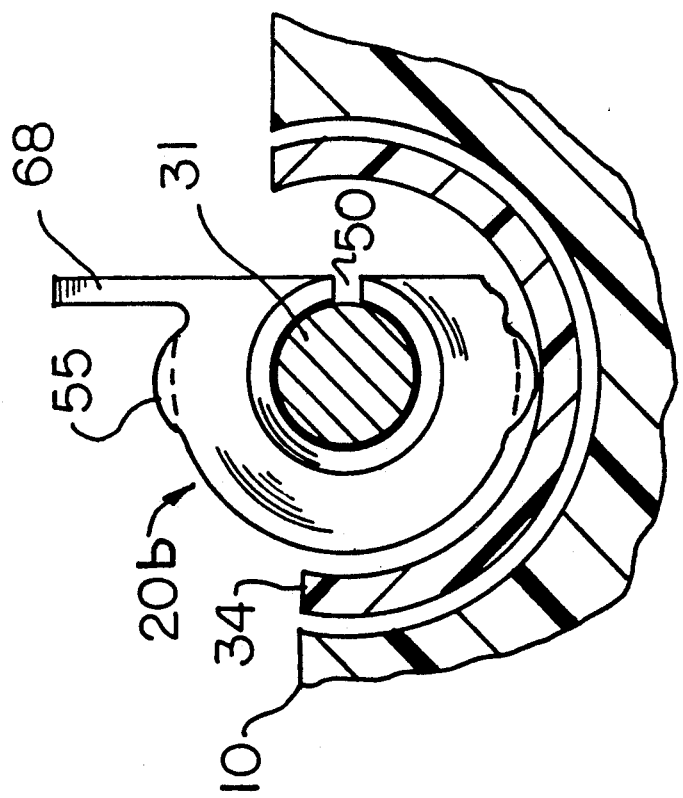

The purposes of the various features of the new bearings 20b and 20c can be understood more clearly by considering the steps involved in using a new bearing 20b in re-building a toner cartridge (the use of 20c is identical). In disassembly of the worn cartridge, one would, inter alia, remove the gear-driven end of the toner roller from the cartridge body 10 by first removing the cartridge end cap 24 by pulling it to the left in the view shown in FIG. 1 (note that in many toner cartridge designs, the cartridge end cap includes a cylindrical sleeve that serves as the bearing retainer 34). One then twists the roller 15 from the body 10 and slides the gear 22 off a flattened portion of the toner roller shaft 31, and slides the bearing 20 off the shaft 31. On re-assembly, one would proceed in reverse order, and would place the new bearing 20b on the shaft 31 so that the ear 68 faced away from the bearing housing 34 (This position is shown in FIG. 5a of the drawing, which is a cross-section along a line indicated by the reference numeral 70 in FIG. 1.). In the view of FIG. 1, the ear 68 would be positioned so as to extend outward from the toner roller 15—i.e. out of the plane of the drawing of FIG. 1). Then after re-inserting the toner roller 15, one would push the end cap 24 into a recess in the toner cartridge body 10.

When in the position shown in FIG. 5a of the drawing, the new bearing 20b can be slid easily into position. The diameter of the inner surface 44 is at least as great as that of the original equipment manufacturer's bearing 20a, so the bearing 20b slides freely onto the shaft 31.

Once the above recited components of the toner cartridge are assembled, the new bearing 20b can be rotated into its seated position (shown in FIG. 5b) by pushing on the ear 68 (e.g. by pushing downward in the view of FIG. 1). In this position, the excess diameter of the outer bearing surface 58 of the new bearing 20b is rotated into a zero tolerance fit in the bearing housing 34. As the bearing 20b is wedged into the housing 34, the slot 50 is forced partially closed, thus securing a zero tolerance fit at both the inner 44 and outer 58 bearing surfaces of the improved bearing 20b. If, as is commonly the case, the bearing retainer 34 is in the form of a relatively thin cylindrical shell, the act of rotating the new bearing 20b or 20c into its locked position can force the walls of the bearing retainer 34 outward so as to obtain a zero tolerance fit between the bearing retainer 34 and the body 10 of toner cartridge (e.g. as shown in FIG. 5b).

The proper position for the bearing 20b can be felt by the installer when the locking ridge 65 is rotated past the end 72 of the bearing housing wall 34 and snaps perceptibly into place.

It should be noted that a further benefit of the improved bearing of the invention is that a zero tolerance fit is maintained even as the bearing wears. When the inner surface 44 of the new bearing 20b wears, the compressive forces resulting from jamming the bearing 20b into the housing 34 will cause the slot 50 to shrink further, and maintain the zero tolerance fit. Thus, for a given combination of OEM bearing 20a, housing 34 and replacement bearing 20b, one can select the width of the slot 50 so that the flat faces 74 that bound the slot are a first predetermined distance apart (e.g. 0.030") prior to installation; a second predetermined distance (e.g. 0.020") when first installed; and a third predetermined distance (e.g. 0.015") when the replacement bearing 20b is worn out. Whenever the cartridge is recharged with additional toner these gap widths can be easily checked without disassembling the cartridge to make the measurement.

Alternately, of course, one could choose the dimensions of the improved bearings 20b, 20c so that the slot 50 closed completely when the bearing was installed. In comparison with the approach described above, this "zero gap" approach would provide a more nearly cylindrical inner bearing surface for the toner roller 15 when the bearing was first installed. The disadvantages of the "zero gap" approach are, of course, that there would be no change in gap width to indicate wear, and wear would result in a greater amount of lateral "play" in the toner roller 15 over the service life of the bearing.

The improved bearings taught herein provide means of rebuilding a toner cartridge so that excess toner does not pass through a wedged and enlarged gap between the doctor blade 12 and the toner roller 15. This solves the "right side problem" and reduces the amount of toner used.

Although the present invention has been described with respect to a preferred embodiment, many modifications and alterations can be made without departing from the invention. Accordingly, it is intended that all such modifications and alterations be considered as within the spirit and scope of the invention as defined in the attached claims.

What is desired to be secured by Letters Patent is:

I claim:

1. A bearing for use in an electrostatic toner cartridge, said cartridge including a toner roller shaft having a first external radius and a bearing retainer having a second internal radius, said bearing comprising an inner bearing surface comprising a section of a right circular cylinder drawn about a cylindrical axis and having a third radius slightly larger than said first radius whereby said bearing is adapted to be slid onto said shaft, a composite outer surface comprising a generally flat portion parallel to said cylindrical axis and displaced from said cylindrical axis by a first distance greater than said third radius, a distorted, generally cylindrical portion located at a second distance from said cylindrical axis, said second distance varying between a minimum value slightly less than said second radius at a point distal from said flat portion and a maximum value slightly greater than said second radius at each of two diametrically opposed points lying on a fictitious line passing through said cylindrical axis parallel to said flat portion, and an ear intermediate between a first end of said flat portion and said distorted cylindrical portion and extending parallel to said fictitious line segment, and a slot perpendicular to said flat portion extending from said outer to said inner surface of said bearing, said slot having a predetermined width.

2. A bearing of claim 1 wherein said outer surface further comprises a locking ridge on said distorted cylindrical surface portion, said ridge adjacent a second end of said flat portion.

3. A bearing of claim 2 wherein said locking ridge extends 0.002 inches above an adjacent portion of said outer surface.

4. A bearing of claim 1 wherein said minimum value of said second distance is between 0.0005 to 0.002 inches less than said second radius.

5. A bearing of claim 1 wherein said maximum value of said second distance is between 0.004 and 0.008 inches greater than said second radius.

6. A bearing of claim 1 wherein said third radius is between 0.0005 and 0.002 inches greater than said first radius and wherein said minimum value of said second distance is between 0.0005 to 0.002 inches less than said second radius and wherein said maximum value of said second distance is between 0.004 and 0.008 inches greater than said second radius.

7. A bearing of claim 1 wherein said third radius is between 0.0005 and 0.002 inches greater than said first radius.

8. A bearing for use in an electrostatic toner cartridge, said cartridge including a toner roller shaft having a first external diameter and a bearing retainer having a second internal diameter, said bearing comprising an inner bearing surface comprising a section of a right circular cylinder drawn about a first cylindrical axis and having a third diameter slightly larger than said first diameter whereby said bearing is adapted to be slid onto said shaft, a composite outer surface comprising a generally flat portion parallel to said first cylindrical axis and displaced from said first cylindrical axis by a first distance, a first outer cylindrical portion comprising a section of a second right circular cylinder drawn about said first cylindrical axis, said second cylinder having a fourth diameter slightly less than said second diameter, and a second outer cylindrical portion comprising a section of a third right circular cylinder drawn about a second cylindrical axis parallel to said first cylindrical axis, a segment of said second outer cylindrical portion lying at a distance greater than one half of said fourth diameter from said first axis, and an ear intermediate between a first end of said flat portion and said outer surface portion, and a slot perpendicular to said flat portion and extending from said outer to said inner surface of said bearing, said slot having a predetermined width.

9. A bearing of claim 8 wherein said first and said second cylindrical axes are equidistant from said flat portion and wherein said second outer cylindrical portion has a diameter less than said fourth diameter.

10. A bearing of claim 9 further comprising a third outer cylindrical portion comprising a section of a fourth right circular cylinder drawn about a third cylindrical axis parallel to said first cylindrical axis and located equidistant from said flat portion with said first axis, a segment of said third outer cylindrical portion lying at a distance greater than one half of said fourth diameter from said first axis.

11. A bearing of claim 8 wherein said second cylindrical axis lies on a fictitious line segment extending from said first cylindrical axis to said flat portion wherein said second outer cylindrical portion has a diameter greater than said fourth diameter.

* * * * *